United States Patent [19]

Behrin

[11] Patent Number: 5,761,254
[45] Date of Patent: Jun. 2, 1998

[54] DIGITAL ARCHITECTURE FOR RECOVERING NRZ/NRZI DATA

[75] Inventor: Michael N. Behrin, Nevada City, Calif.

[73] Assignee: Advanced Micro Devices, Inc., Sunnyvale, Calif.

[21] Appl. No.: 594,211

[22] Filed: Jan. 31, 1996

[51] Int. Cl.$^6$ .................................................. H04L 7/00
[52] U.S. Cl. ........................ 375/355; 375/371; 375/376
[58] Field of Search ................................ 375/371, 373, 375/355, 359, 360, 376; 327/141, 144; 371/1

[56] References Cited

U.S. PATENT DOCUMENTS

| | | | |
|---|---|---|---|
| 4,841,551 | 6/1989 | Avaneas | 375/373 |
| 5,022,056 | 6/1991 | Handerson et al. | 375/373 |
| 5,034,967 | 7/1991 | Cox et al. | 375/360 |
| 5,134,637 | 7/1992 | Beyer et al. | 375/373 |
| 5,185,768 | 2/1993 | Ferraiolo et al. | 375/373 |
| 5,412,698 | 5/1995 | Van Brunt et al. | 375/371 |
| 5,487,092 | 1/1996 | Finney et al. | 375/373 |

*Primary Examiner*—Tesfaldet Bocure
*Attorney, Agent, or Firm*—Gerald M. Fisher

[57] ABSTRACT

A method and apparatus for generating a data signal from a transmitted data signal that has been distorted by duty cycle jitter. A locally generated symbol signal is propagated in a delay line such that taps along the delay line emit bit phase signals that are used to clock transitions of the data signal. The position of the data transitions are accorded a numerical value with reference to the bit boundaries and numerically averaged to determine a most desired time to detect the logic level of the data sample.

15 Claims, 18 Drawing Sheets

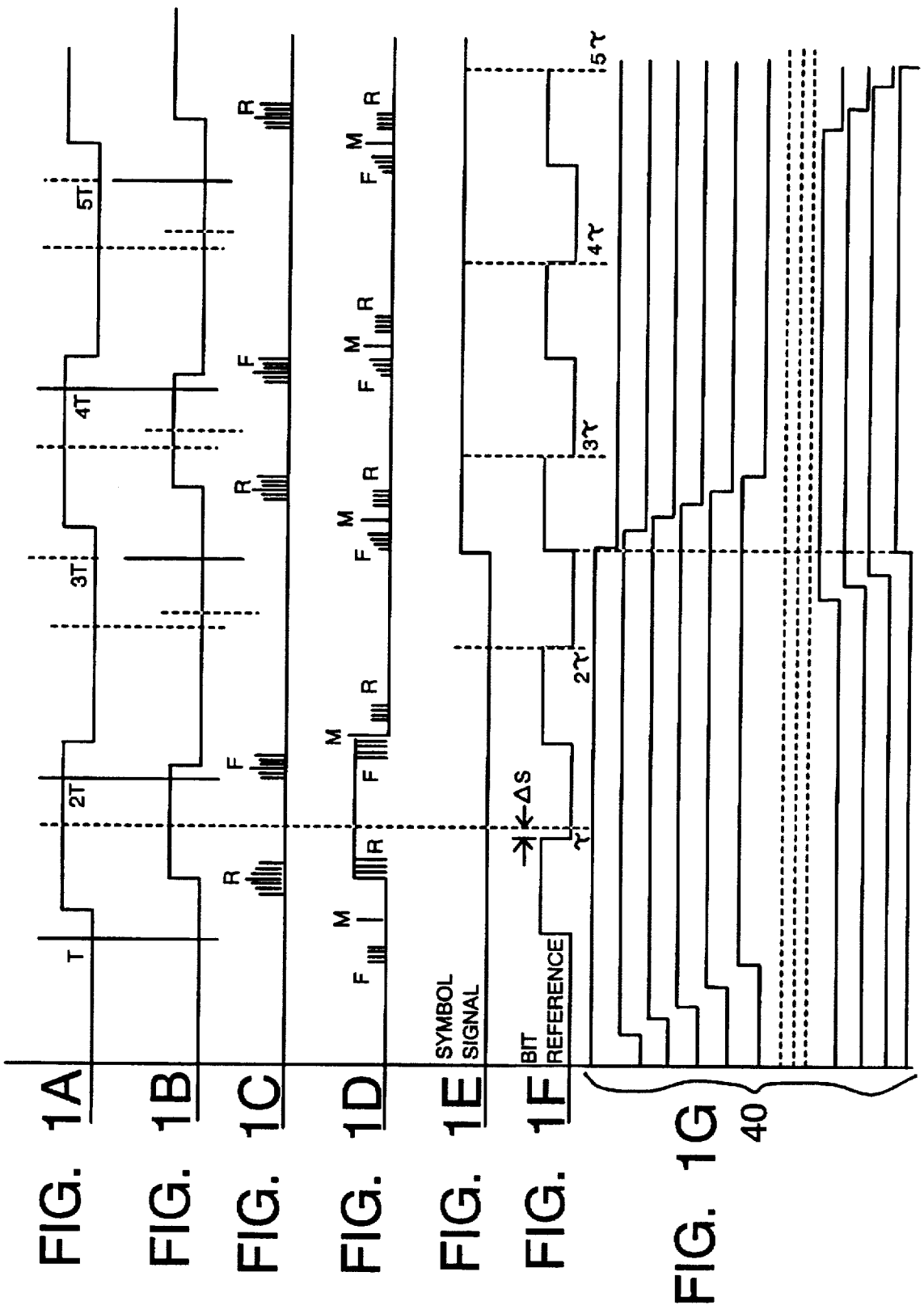

(BIT REFERENCE)

(DATA SIGNAL 1,1)

$$d = 8 - (b_1 + b_2)$$
$$a_{ri} = 4 - b_1$$
$$a_{fl} = 4 + b_2$$
$$\frac{d}{2} = 4 - \frac{b_1 + b_2}{2} = 4 - \frac{(4 - a_{ri}) + (a_{fl} - 4)}{2}$$
$$\mathcal{S} = b_2 + \frac{d}{2} = (a_{fl} - 4) + \left[ 4 - \frac{(4 - a_{ri}) + (a_{fl} - 4)}{2} \right]$$
$$\mathcal{S} = \frac{a_{fl} + a_{ri}}{2}$$
$$\Delta S = \mathcal{S} - 4$$

TABLE 1

| | | | | | | |
|---|---|---|---|---|---|---|
| -4 -2 0 2 4 6 8 | -4 -2 0 2 4 6 8 | -4 -2 0 2 4 6 8 | -4 -2 0 2 4 6 8 | | | WINDOW REFERENCE 1 |
| -4 -2 0 2 4 6 8 | -4 -2 0 2 4 6 8 | -4 -2 0 2 4 6 8 | -4 -2 0 2 4 6 8 | | | WINDOW REFERENCE 2 |

CAPTURED TRANSITIONS: WINDOW#8 WINDOW#7 WINDOW#6 WINDOW#5 WINDOW#4 WINDOW#3 WINDOW#2 WINDOW#1

ASSIGNED NUMERICAL VALUE: 1, 2, 0, 2, -1, 3

TIME: $t_0$

DATA SAMPLING REFERENCE: 0 0 0 0 0 0 0 0

AVERAGE CALCULATION:

RISING EDGE AVERAGE = $\frac{3+2+2}{3} = 2.33$

FALLING EDGE AVERAGE = $\frac{-1+0+1}{3} = 0$

COMBINED AVERAGE = $2.33/2 = 1.167$

FIG. 5C

| INPUT | | | | | | | | OUTPUT | | | |
|---|---|---|---|---|---|---|---|---|---|---|---|
| a[7] | a[6] | a[5] | a[4] | a[3] | a[2] | a[1] | a[0] | b[3] | b[2] | b[1] | b[0] |
| 0 | 0 | 0 | 0 | 0 | 0 | 0 | 1 | 1 | 1 | 0 | 0 |
| 0 | 0 | 0 | 0 | 0 | 0 | 1 | x | 1 | 1 | 0 | 1 |
| 0 | 0 | 0 | 0 | 0 | 1 | x | x | 1 | 1 | 1 | 0 |
| 0 | 0 | 0 | 0 | 1 | x | x | x | 1 | 1 | 1 | 1 |
| 0 | 0 | 0 | 1 | x | x | x | x | 0 | 0 | 0 | 0 |
| 0 | 0 | 1 | x | x | x | x | x | 0 | 0 | 0 | 1 |
| 0 | 1 | x | x | x | x | x | x | 0 | 0 | 1 | 0 |
| 1 | x | x | x | x | x | x | x | 0 | 0 | 1 | 1 |

FIG. 5G

| INPUT | | | | OUTPUT | | | | | | | |
|---|---|---|---|---|---|---|---|---|---|---|---|
| X[3] | X[2] | X[1] | X[0] | Y[7] | Y[6] | Y[5] | Y[4] | Y[3] | Y[2] | Y[1] | Y[0] |
| X | 1 | 0 | 0 | 0 | 0 | 0 | 1 | 0 | 0 | 0 | 0 |
| X | 1 | 0 | 1 | 0 | 0 | 1 | 0 | 0 | 0 | 0 | 0 |
| X | 1 | 1 | 0 | 0 | 1 | 0 | 0 | 0 | 0 | 0 | 0 |
| X | 1 | 1 | 1 | 1 | 0 | 0 | 0 | 0 | 0 | 0 | 0 |
| X | 0 | 0 | 0 | 0 | 0 | 0 | 0 | 0 | 0 | 0 | 1 |
| X | 0 | 0 | 1 | 0 | 0 | 0 | 0 | 0 | 0 | 1 | 0 |
| X | 0 | 1 | 0 | 0 | 0 | 0 | 0 | 0 | 1 | 0 | 0 |
| X | 0 | 1 | 1 | 0 | 0 | 0 | 0 | 1 | 0 | 0 | 0 |

X = DON'T CARE

FIG. 11

DIGITAL ARCHITECTURE FOR RECOVERING NRZ/NRZI DATA

FIELD OF THE INVENTION

This invention relates to a method and apparatus for recovering serially transmitted data and particularly to an architecture which uses a delay line to perform high frequency sampling of the serially transmitted signal in order to detect the positions of the rising and falling transitions of the signal.

BACKGROUND OF THE INVENTION

In a data transmission system, the receiver recovers the incoming serial signal data generated and sent by a transmitter and propagated through the transmission medium. The transitions in the data stream provide both the data and the timing information of the transmitter reference frequency. Ideally, these transitions arrive at the receiver at time intervals that equal the bit period or a multiple of the bit period of the reference frequency. In practice, the transitions arrive at a time that is sooner or later than an instant corresponding to ideal transitions generated by an ideal symbol signal transmitted. This variation of transition times from transitions of an ideal signal is called jitter. Total jitter results from a combination of sources which may be characterized as random jitter (RJ) and deterministic jitter (DJ). A major source of deterministic jitter comes mainly from unequal rising and falling delays arising from components in the transmission channel and is referred to as "Duty Cycle Distortion" (DCD).

Traditionally, recovery of data from a serial data stream transmitted with a fixed frequency reference and which is characterized by jitter arising from phase distortion has been accomplished using an analog phase lock loop which recovers data by adjusting a Voltage Controlled Oscillator such that its output signal minimizes the phase error with respect to the incoming data stream.

The versatility of CMOS circuit technology and the adaptability of CMOS technology to VLSI architecture makes it possible to use digital techniques to reduce the effects of jitter.

SUMMARY OF THE INVENTION

It is an object of this invention to provide an all digital method and apparatus for compensating for jitter in incoming data streams serially transmitted with a fixed frequency reference that is an improvement over methods of the prior art in terms of economy and compatibility with current manufacturing trends.

In particular, it is an object to provide a digital method and apparatus for data recovery which has a low probability of error and is adaptable to high data rates including FDDI applications.

In order to achieve the objects of this invention, CMOS techniques have been adapted to the construction of delay circuits and incorporated into VLSI architecture.

The architecture of this invention is directed toward a delay line having taps between the delay cells of the delay line. Each tap provides a differently delayed bit phase signal which is responsive to the clock reference signal applied to the beginning of the delay line. The bit phase signal from each tap is displaced in phase from the bit phase signal to a neighboring tap by a value that is a fraction of the period of the bit reference signal ($T_{TAP}$).

To correct for jitter in the data signal, the data signal is first sampled and stored in a register using the bit phase signals to clock the adjacent flip flops of the register. The data captured by the register is thus a digital representation of the input signal sampled at a frequency of $1/T_{TAP}$. The complete register sample spans one symbol-clock period since the delay line is calibrated so that a previous transition of the symbol clock arrives at the end of the delay line (in the present embodiment, the delay is 40 ns) at the time that a new symbol clock transition occurs. The "symbol" data is partitioned into smaller registers corresponding to bit periods of the signal (five partitions in the present embodiment because there are five bits per symbol in FDDI data). These "data bit" registers have a fixed relationship to the symbol clock and thus provide a virtual local bit clock which is ⅕ of the symbol clock period. No actual local bit clock is generated. As a result, the phase relationship between the virtual local bit clock and the signal transitions can be determined for each transition that is captured into the registers. The bit clock reference edges occur when a symbol clock transition passes a delay line tap that is a multiple of 8 ns. Transitions within the data bit register are located by observing which adjacent bits have a different logic level using an exclusive-or function. A numerical value is assigned to each transition found in a data-bit register based upon its position with respect to the register boundary (i.e., the virtual bit clock). The numerical values obtained from the data-bit register are then averaged (filtered) in order to determine a mean edge position with respect to the "data-bit" register boundaries (i.e., the virtual bit-clock). The optimum location for extracting the recovered data from the "data-bit" registers is one half bit period away from the mean edge position. The mean edge position is also used to generate a recovered symbol clock signal which is synchronized with the received serial data and used for transferring recovered data to other devices.

BRIEF DESCRIPTION OF THE FIGURES

FIG. 1(A) shows the "ideal" waveform of a data signal comprising a series of "ones".

FIG. 1(B) shows the waveform of 1A distorted by Duty Cycle Distortion (DCD).

FIG. 1(C) shows the spread of rise times and fall times for data signal "ones" of FIG. 1(B).

FIG. 1(D) shows the spread in rising and falling transitions of a typical data signal.

FIG. 1(E) shows the locally generated symbol signal which is used to clock incoming data.

FIG. 1(F) shows a bit reference signal which is a multiple of the symbol signal.

FIG. 1(G) shows the bit phase signals generated by delay line taps.

FIG. 5(C) is an edge assignment example.

FIG. 5(G) is a second edge assignment example.

FIG. 11 is a pointer Generator Truth Table.

DETAILED DESCRIPTION OF THE INVENTION

Figure 3:
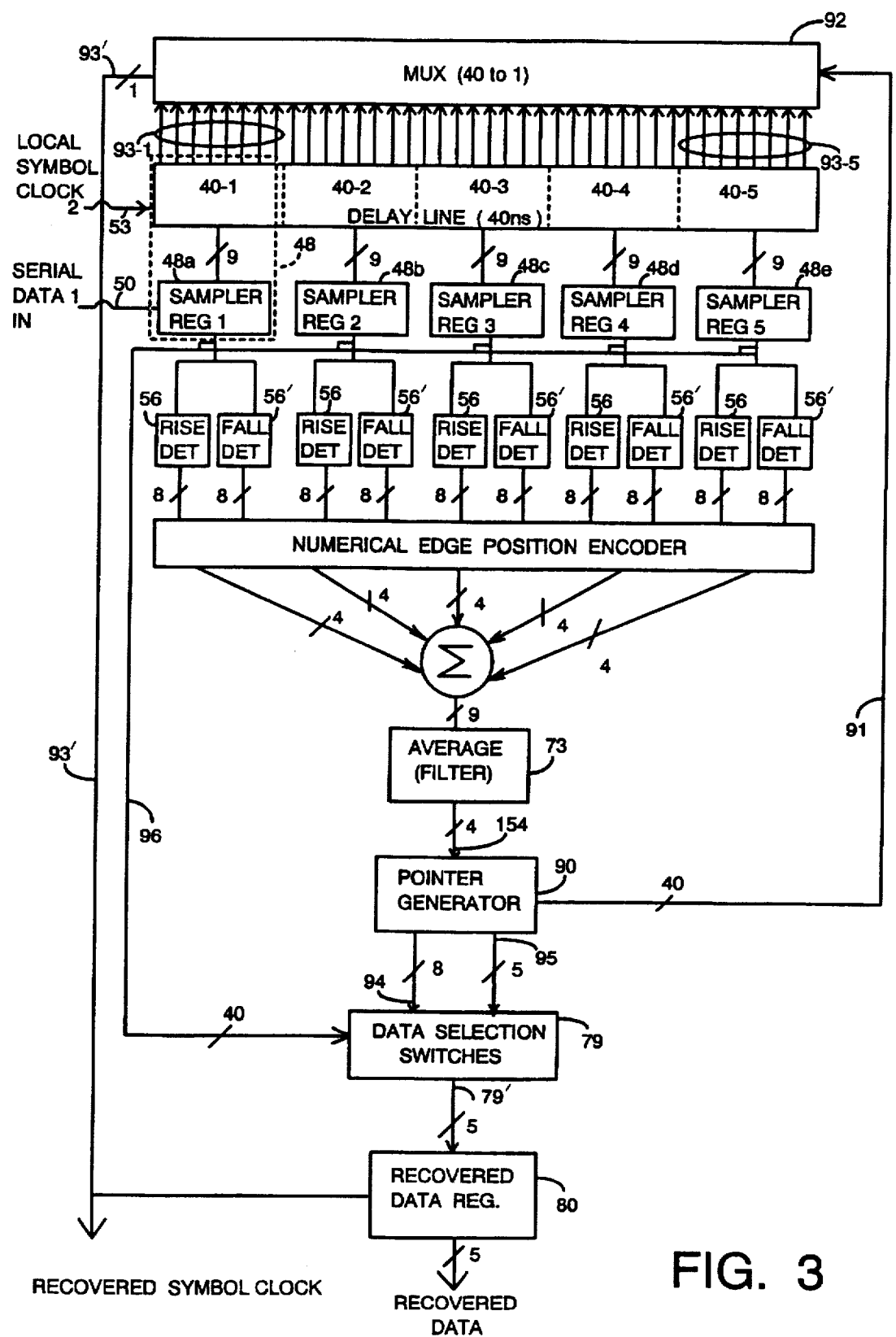
FIG. 3 is a simplified block diagram illustrating overall architecture of the invention.

With reference to FIG. 3, the overall concept of the invention can be understood.

The apparatus of FIG. 3 is intended to provide a Recovered-Data-Out 5 from the Recovered Data Register 80. The Recovered-Data-Out is a correct representation of the data contained in the Serial-Data-In 1 even in the presence of large jitter distortion of the incoming data. The apparatus provides a method for examining the instants at which the rising and falling transitions occur of the Serial-Data-In 1 by establishing statistics based on these examinations as to where the transitions are most likely to occur and then causes the sampling of the data in the Recovered Data Register 80 to take place at the instants in time which on average is most removed from the transition times.

A local reference signal, i.e., Local Symbol Clock 2, is generated by the receiver which is specified as ±50 PPM from a standard frequency. The data rate of Serial-Data-In is derived from a remote transmitter having the same specification. The Local Symbol Clock input 2 and 40 output taps, 93-1 to 93-40, are connected to Delay Line 40. The Delay Line 40 has 5 groups of 9 taps connected to the series of 5 registers 48a though 48e to the clock inputs of adjacent register bits. The most significant bit of 48a is clocked by the local symbol clock. The second most significant bit is clocked by the first delay line tap. The third most significant bit through the least significant bit are clocked by the second through eighth delay line taps, respectively. The most significant bit of 48b is also clocked by the eighth delay line tap (i.e., the least significant bit of 48a and most significant bit of 48b are shared). The second most significant bit of 48b through the least significant bit of 48b are connected to delay line taps 9 through 16, respectively. Register 48c, 48d and 48e are similarly connected. The group of connections 93-1 through 93-40 to the delay line 40 taps are connected to MUX 92. For this example, the delay line is 40ns long for a 125 MHz symbol clock and has 40 taps, i.e., at 1ns intervals. Each tap provides a bit phase signal which is identical to the clock reference signal, i.e., Local Symbol Clock, applied to the beginning of the delay line but delayed. The Serial-Data-In signal 1 is captured by each register 48a though 48e using the corresponding bit phase signals to clock the registers, i.e., the Serial-Data-In signal is applied to the "D" input of each bit of registers 48a through 48e.

The data captured by the registers 48a through 48e is thus a digital representation of the input signal sampled at the frequency of the inverse of the time delay between adjacent delay line taps. The complete sample spans one symbol clock period so long as the delay line is calibrated so that the transition of the symbol clock arrives at the end of the Delay Line at the same instant that the next symbol arrives at the beginning. Since there are 5 bits per symbol in this example (FDDI specification), a bit can be made to reside in each register. This means that the phase relationship of a bit can be quantified by assigning a numerical value to each transition in a data bit register based upon its physical position in the register at the sampling instant. This function of assigning a numerical value employs a transition rise detector 56 and transition falling detector 56' for analyzing the captured data in the Registers 1 through Register 5 in edge detector circuits (FIG. 5(A) and FIG. 5(B)). Next, each of rising transition and falling transitions are accorded a numerical value in encoder 64 depending on its position from the center of the register. The rising and falling transitions are averaged in Averager 73 and the computation of tap select command 91 in pointer generator 90 will control the MUX 92 and selects the tap of the Delay Line 40, which output 93' is fed to the Recovered Data Register 80. The pointer generator 90 signals 94 and 95 are applied to data selection switches 79 and select the five taps in the 40 bit delay line sample 96 which are one half of one bit period away from the average edge position. The output 93' of MUX 92 is the Recovered Symbol Clock and is the phase shifted clock which latches the data selection switch array output 79'0 into the Recovered Data Register 80.

FIG. 1(A) represents the waveform (high and low levels) of a transmitted string of "1"s code in NRZI. Five transitions (three rising and two falling) are shown representing a "word" of five "1"s (bits). The initial wave as transmitted is shown as "ideal" in that the high and low periods of each cycle are equal to a "bit" period There are five bits within the Delay Line during each word cycle. The rise transitions are centered around a "rise mean" (R) and the fall transitions are centered around a "fall mean" (F) so that a "transition mean" (M) will be an average.

FIG. 1(B) shows the received signal derived from the wave of FIG. 1(A.) This signal exhibits Duty Cycle Distortion. The "low" periods are shown as being longer than the high periods.

FIG. 1(C) shows the five bit word of "1"s transmitted several times and shows a distribution of fall and rise transition occurring about respective mean times $T_f$ and $T_r$. This condition arises because of circuit noise in transmission and recovery.

FIG. 1(D) shows a typical data stream comprising an arbitrary collection of "1"s and "0"s over a period of several "word" cycles.

To accurately extract the data from the incoming signal, one must detect the signal level of the incoming signal wave at the instants in time where transitions are not likely to occur. This is called the center of the "eye." It will be convenient to define a "bit reference period" as being the period which contains one bit. A discrete number of bit reference periods, FIG. 1(F), equals a period of one symbol period as shown in FIG. 1(E). In the example used to illustrate this embodiment, one symbol period FIG. 1(E) equals five bit reference periods, i.e., five bits per symbol. The process of locating the optimum bit phase signal to sample the incoming data at the center of the "eye" employs a statistical averaging approach.

Transitions of the bit phase signals FIG. 1(G) are used to sample the serial data signal into adjacent flip-flops which form registers which each span a "bit-reference period". In each "bit-reference period" the register sample is processed to locate a logic level transition through an exclusive-or of adjacent register bits. These transition locations are digitally encoded into a binary number representing the position of the transition with respect to the bit reference period boundaries. Each bit reference period is divided into two phase increments to determine which increment coincides with a data transition. A "transition mean time" is then located by averaging a collection of encoded rise and fall transitions in terms of the phase increments in which they occur.

In this embodiment, the symbol reference signal has a frequency of 25 MHz and is multiplied five times to provide a bit reference period of 8 ns for FDDI applications. One cycle of the symbol signal therefore spans a data symbol length of five bits.

As shown in FIG. 1(A), the center of the "ideal" signal (the undistorted data signal) does not normally coincide with the transitions of the local reference signal. This phase displacement is represented by "s". "s" will change over time as a result of the frequency difference between the local reference and the data reference. The center of the ideal signal will, however coincide with one of the bit-phase signals to an accuracy of $T_{TAP}$ at any given time. According to the invention, adjustment is made in the phase of the symbol clock signal to produce a "recovered symbol clock" signal in which as is zero.

Figures 2A, 2B:
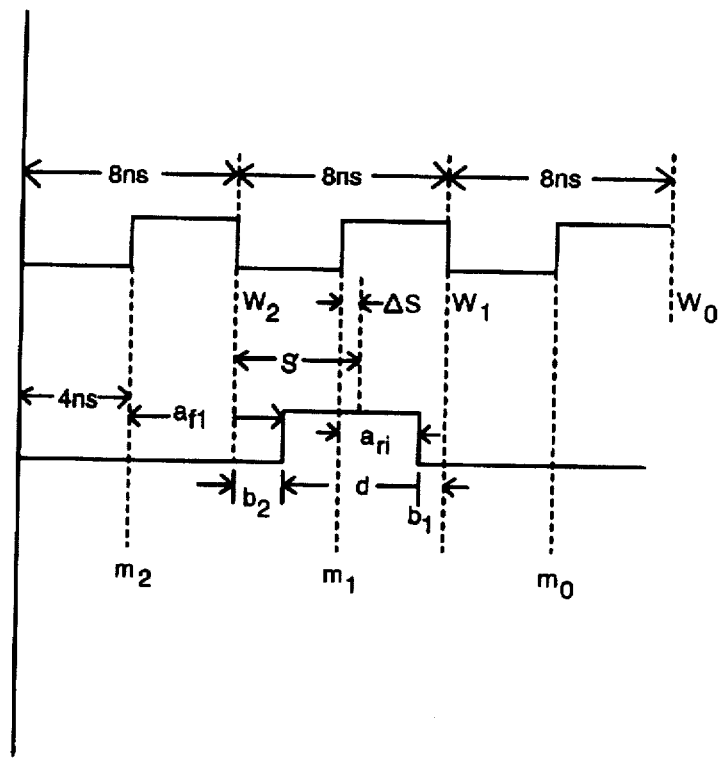
FIGS. 2(A) and 2(B) illustrate duty cycle distortion of the phase and duration of a "1-1" NRZI sequence.

FIG. 2(A) and 2(B) are graphs showing parameters of a "1-1" data sequence used for illustration purposes to compute the average phase time displacement of just two transitions and for generating a recovered data signal in which As is zero. FIG. 2(A) shows three bit reference periods beginning with a rising transition and having boundaries W0, W1 and W2. W0 is the first bit in time. Each bit reference period is 8 ns. FIG. 2(B) shows the "1-1" data signal including one rising and one falling transition. This pulse center instant (ideal sampling point) is displaced from the edge instant of the bit reference period W2 by a period s. It can be shown by simple substitution that:

$$s=(a_{f1}+a_{r1})/2$$

By taking a number of measurements of $a_{r1}$ and $a_{f1}$ for adjacent bit reference cycles to obtain an average value S' and by averaging the values of S' over several bit reference cycles, one obtains an average time, S which is optimum for detecting the data signal:

$$S=(A_r+A_f)/2$$

A finite number of phase time displacements of transitions must be sampled to compute the average phase time displacement where "phase time displacement" means the phase time of a transition with respect to the beginning of the respective bit reference period. The number of consecutive symbol cycles that are used in calculating the average phase time displacement needs to consider the fact that each has a diminished effect on the average as the number of values making up the average is increased. To compute an average $A_r$ and $A_f$ the earliest phase time displacements are subtracted and the latest phase time displacements are added to compute $A_r$ and $A_f$.

Figure 4A:
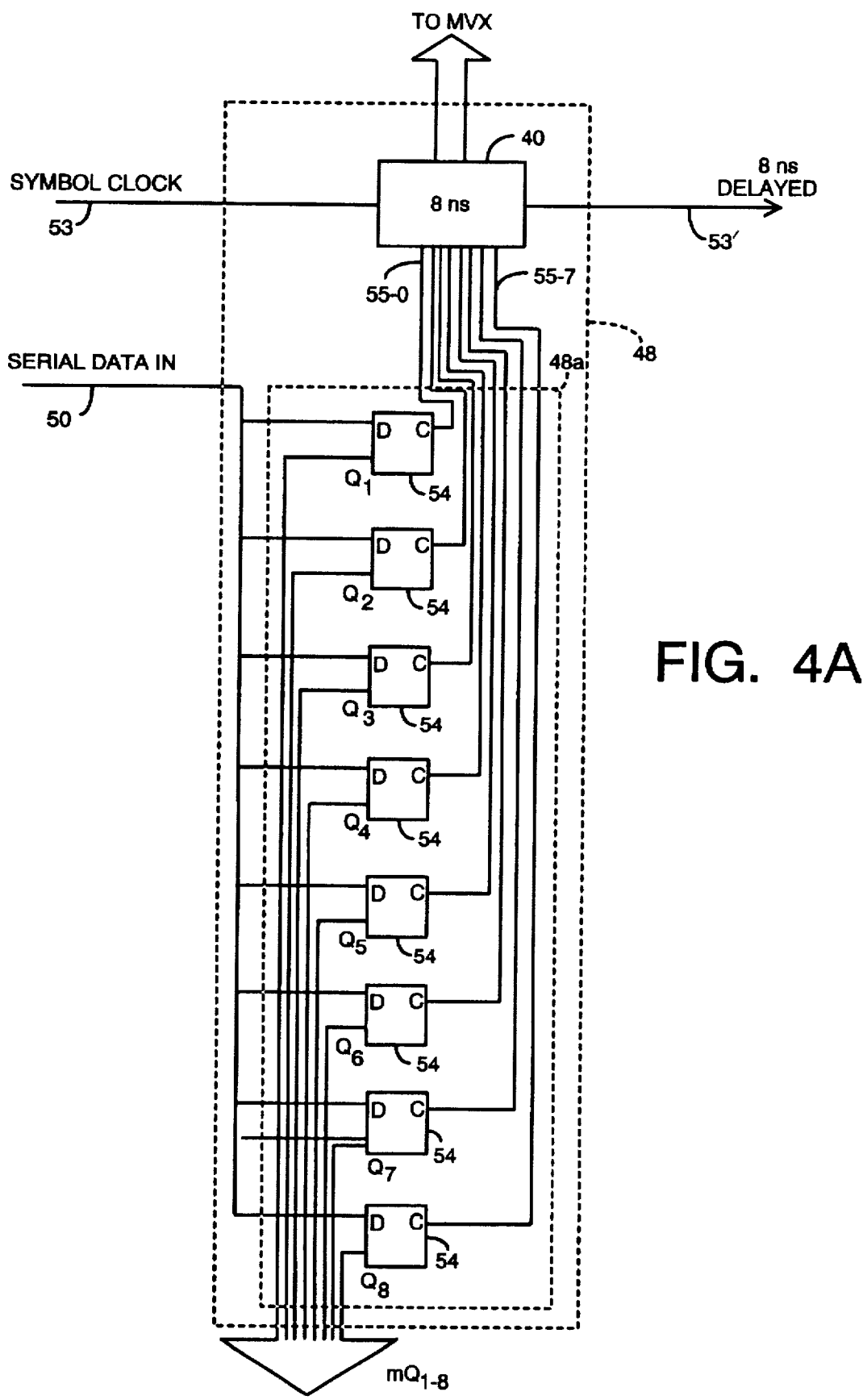
FIG. 4(A) shows the organization of a delay line portion and sampler register for collecting data to compute average positions of the transitions.

FIG. 4(A) illustrates schematically the circuit of one of the five data sampler registers. FIG. 4(B) 48a through 48e, in conjunction with a portion of the delay line 40. The data register 48a–48e, FIG. 4(B), includes 5 columns each containing 8 D type flip-flops 54, FIG. 4(A), corresponding to a symbol (word) of five bits where each single bit is contained in one column. Serial-Data-In transitions are applied via line 50, in parallel, to all of the D terminals of flip-flops 54. A local symbol clock signal is applied on line 53 to delay line 40 which is tapped at 1 ns intervals so that bit phase signals for clocking are emitted on 8. lines 55-0 to 55-7, FIG. 4(A).

Each flip-flop 54 is thereby clocked in succession on the respective C line at 1 ns intervals. A logic level present at the D input is transferred to the Q output upon application of the clock pulse. For each symbol signal period, forty logic level values, mQn are coupled to a transition detector 56 and 56', FIG. 4(B). Each transition detector is composed of adjacent AND gates with one inverted input. Between 1 and 5 rising edge samples and falling edge samples will be captured in any given symbol period.

Figure 4B:
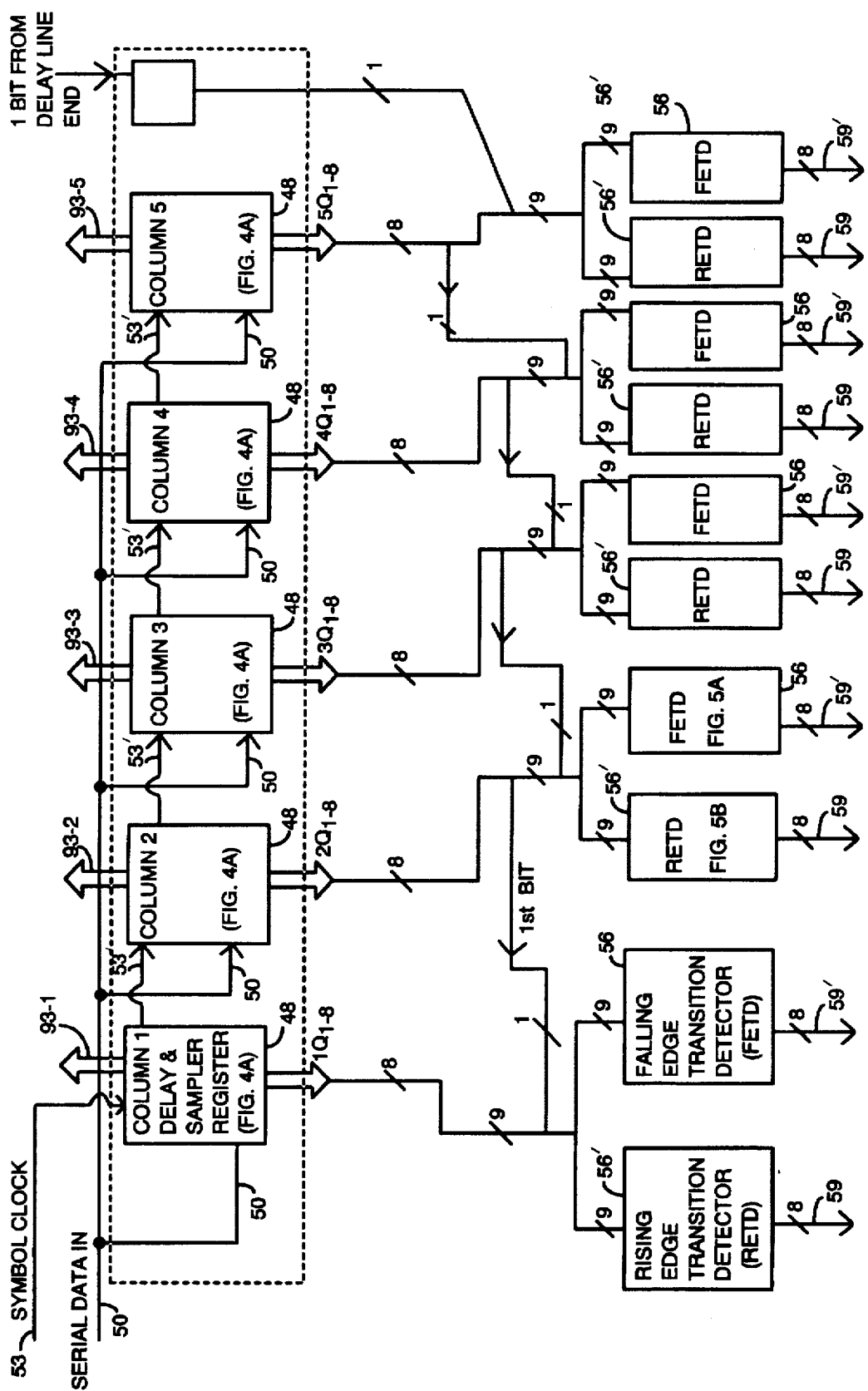
FIG. 4(B) shows the column organizations of delay line/ register and transition detectors of the invention.

FIG. 4(B) shows transition detector circuits 56 and 56' for locating the falling and rising transitions respectively within each group of flip-flops of the Sample Registers 48a–48e. There are 5 groups of AND gates 58 in Rising Edge Detector 56' of FIG. 5(B) for locating the rising edge and 5 groups of AND gates 58 for locating the falling edges, FIG. 5(A).

Figure 5A:
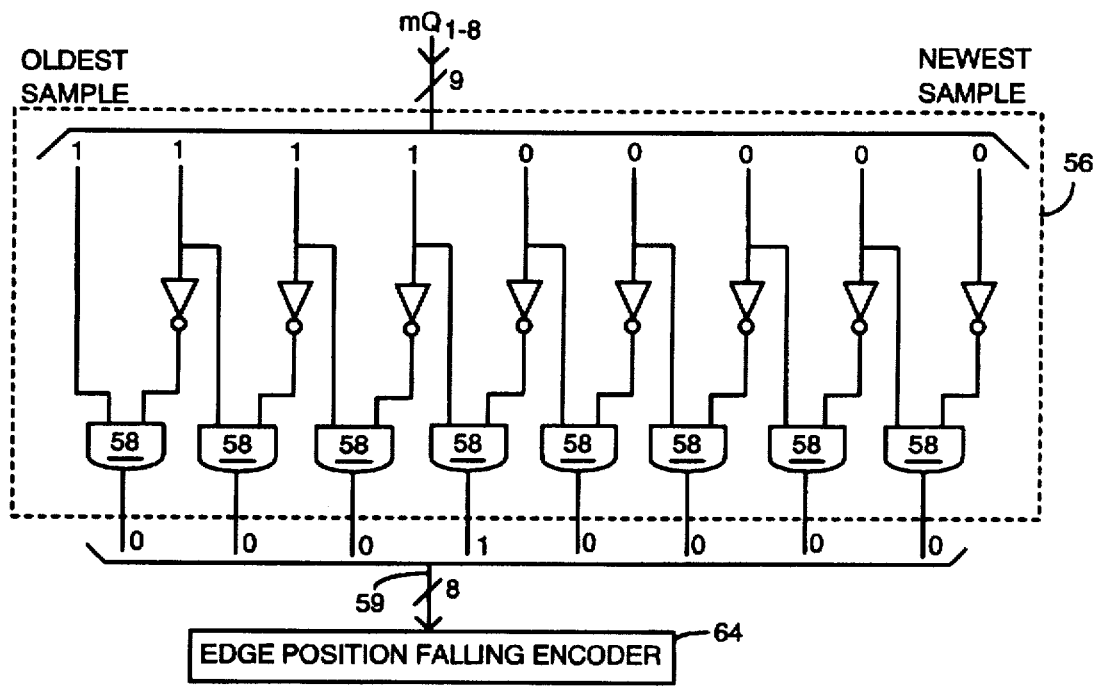
FIGS. 5(A) and 5(B) show a circuit for detecting rising and falling transitions.
Figure 5B:
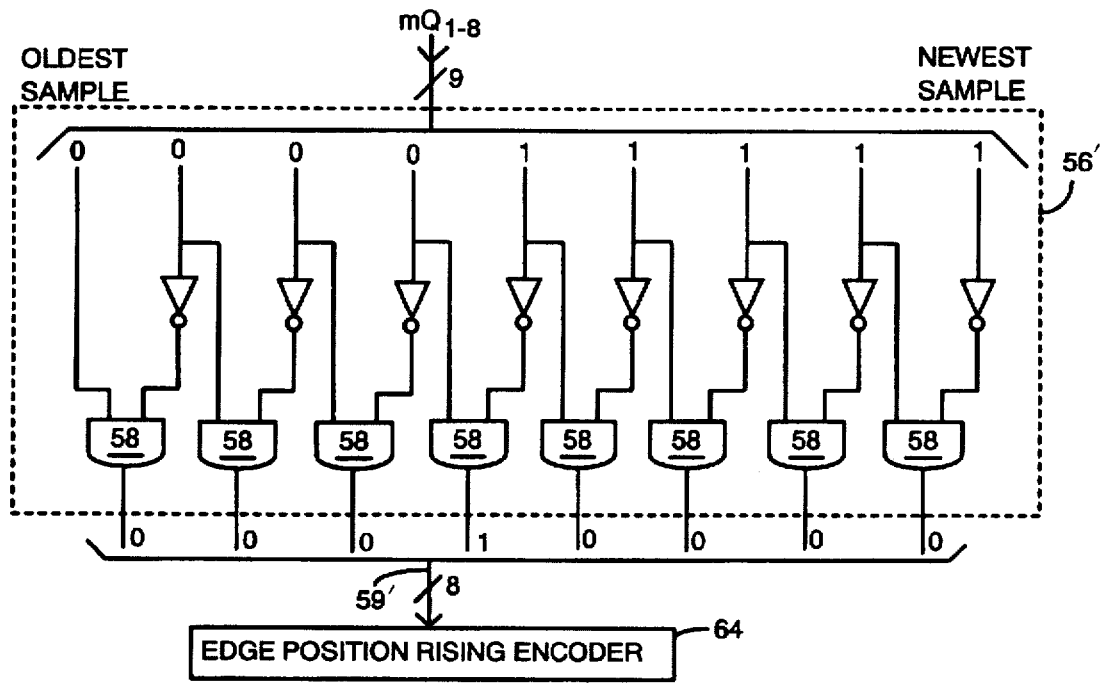

FIG. 5(A) shows neighboring AND gates 58 with inverted AND gate inputs on the right side of the AND gate. FIG. 5(B) shows the inverted AND gate input on left side of the AND gate.

After locating the position of the transition, we assign a numerical value to each detected transition. The number value is based up the relation of the position of the edge with respect to the register boundaries. The numerical assignment process can be understood by reference to the two cases shown in FIG. 5(C). FIG. 5(C) and FIG. 5(G) shows two cases of edge position assignment as applicable to two waveforms which are the same but which are shifted in phase with respect to the sampling window. Time is shown with T increasing to the left, as would be observed in the sampler registers with the symbol clock signal propagating from left to the right through the delay line causing the waveform transitions to be captured in time as shown. Edge position values are assigned with respect to the center of each window, bounded by the dashed lines at intervals of 8 ns.

As seen in case 1 of FIG. 5(c), window reference 2 is laid out with its "0" aligned with the center of odd numbered windows, and window reference 1 is aligned with its "0" aligned with the center of the even number windows.. Note that the rising edge which appears in window #1 is assigned a numerical value "3". The 3 is derived from the fact that the edge aligned with space between 2 and 4 in the window reference 2 row. The next edge is a falling edge and it is assigned a numerical value of "−1" and this is derived by alignment with the space between 0 and −2 from window reference 1.

It is also shown in case 1 of FIG. 5(c) how the Rising Edge Average and *C% Falling Edge Average is obtained. For example, the Rising Edge Average is obtained by adding $$\frac{3+2+2}{3} = \frac{7}{3} = 2.33.$$

Falling Edge Average is $$-1+0+1 = \frac{0}{3} = 0$$

and the combined average is $$\frac{2.33}{2} = 1.167.$$

Figure 5D:
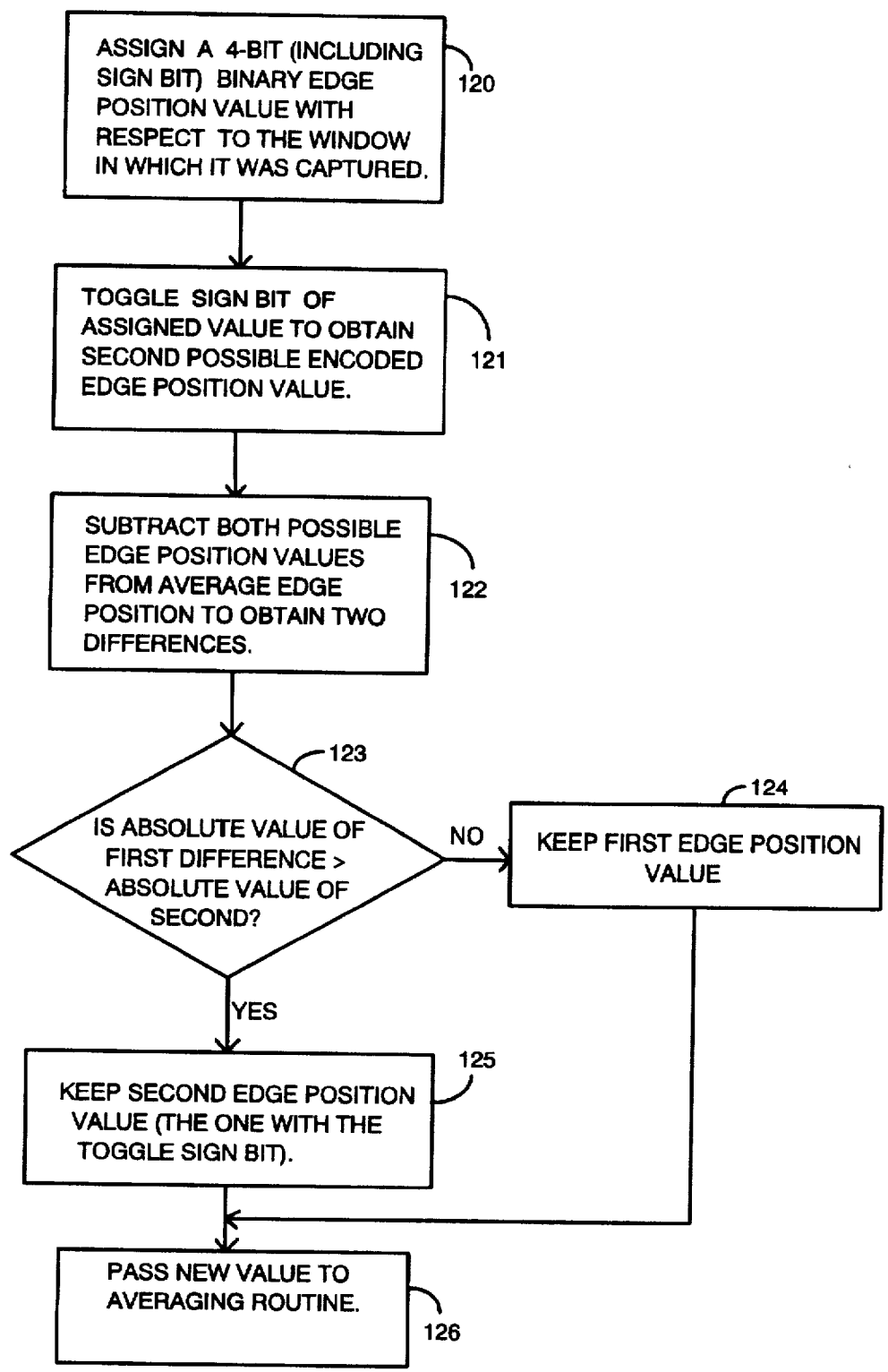
FIG. 5(D) is edge encoding algorithm block diagram.

The flow diagram of the algorithm which assigns the numerical value to the position edges is illustrated in FIG. 5(D). In step 120, each edge position is assigned a signed 4 bit binary number. This number can be assigned with respect to the reference numbers of the window in which it was captured (−4 to +4) or with respect to an adjacent window (−4 to −8 or +4 to +8). The correct numerical assignment is one that is the minimum distance from the current (next previous) average position.

It is instructive to consider the following example which follows the algorithm of FIG. 5(D). Assume the current average assigned value=−3. The number −3 in 2's complement representation is 1101. Now, assume the initial binary edge position for this example is (0010) or 2 and the sign bit is the most left bit. According to step 121 FIG. 5(D), the second assigned value is 1010 by toggling the sign bit. This is equivalent to −6 (2's complement).

According to step 122, we perform a difference from the average for both assigned values.

Difference 1=−3−2=−5 and |−5|=5

Difference 2=−3−(−6)=3 and |3|=3

Since |5|>|3|, for this example the correct edge position assignment is −6 (1010).

Figures 5E, 5F:
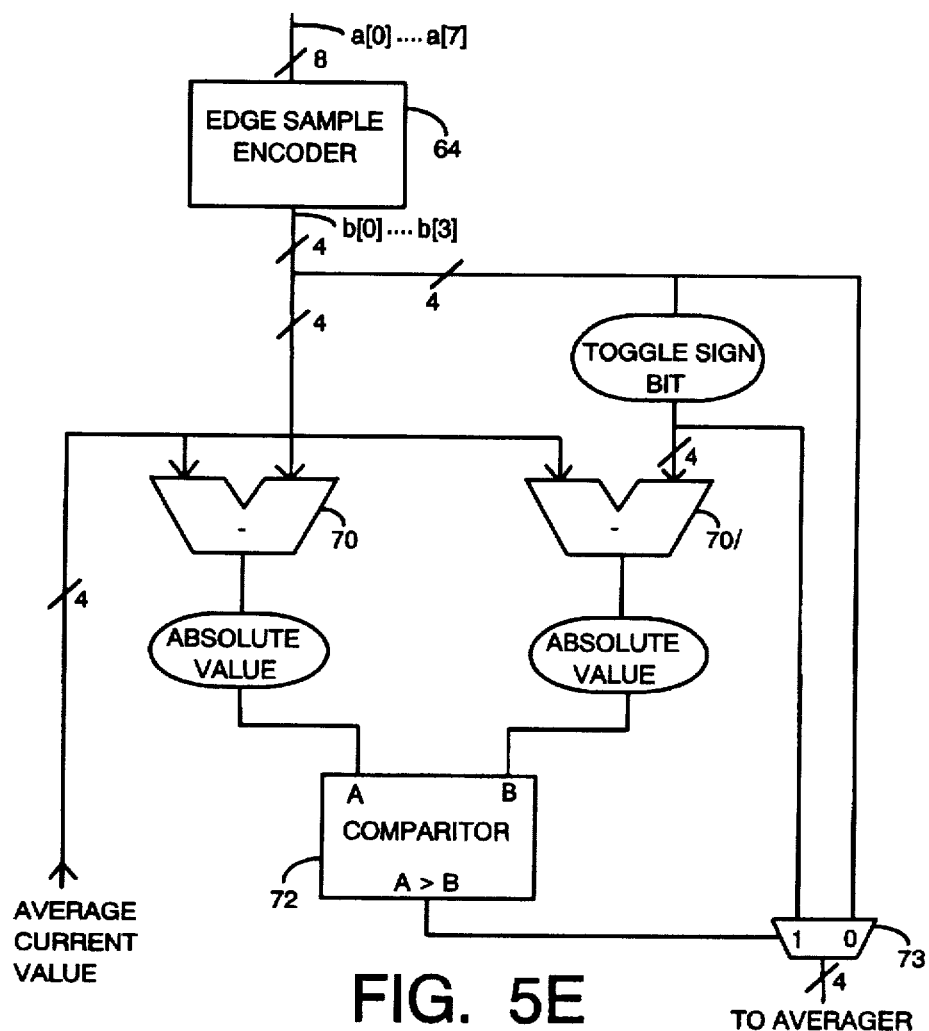
FIG. 5(E) is circuit for accomplishing the algorithm of FIG. 5(d).
FIG. 5(F) is a truth table which shows how edge position data is converted into a binary value.
Figure 5G:
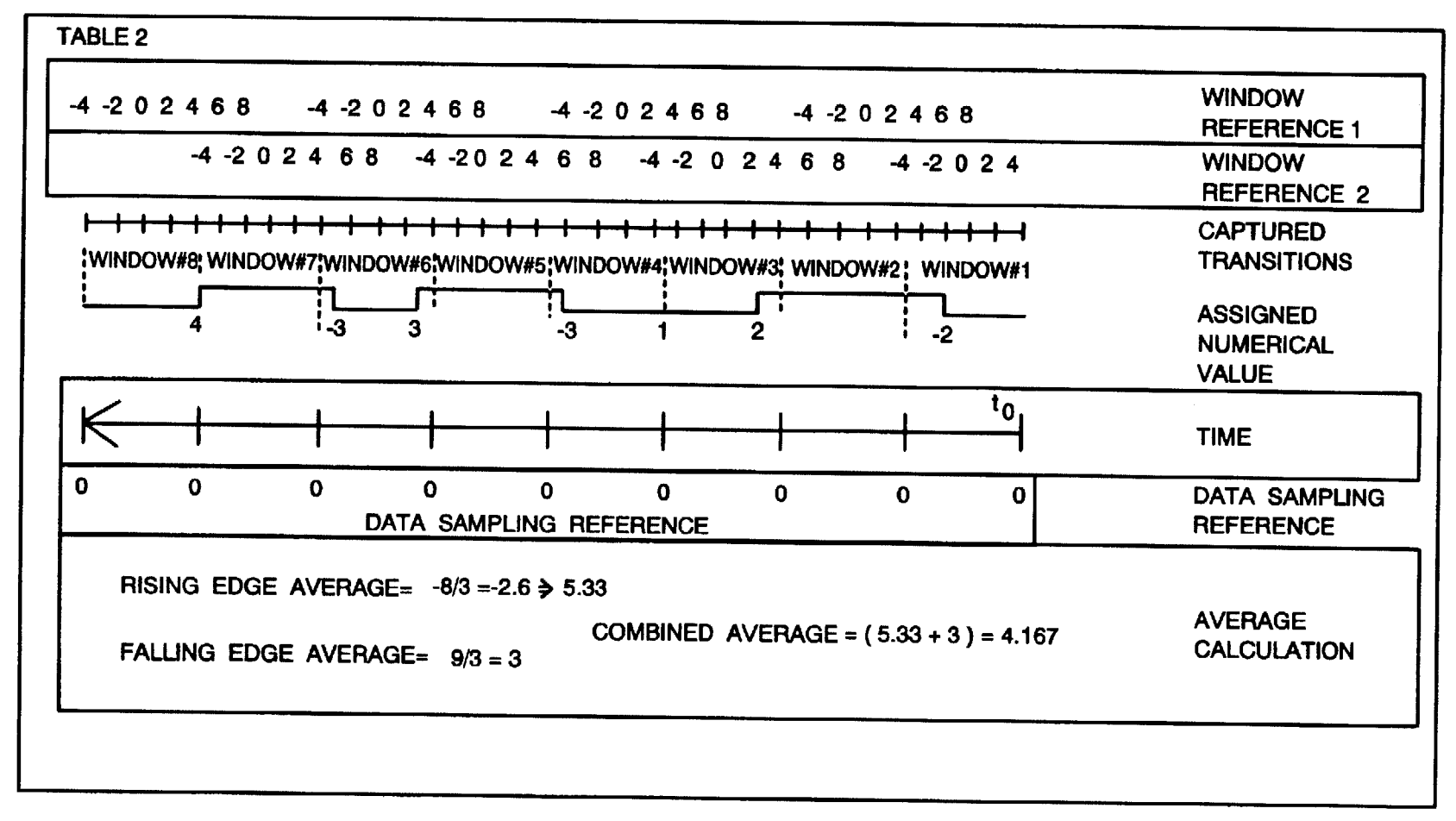

FIG. 5(E) shows a block diagram of circuitry which will implement the numerical value assignment algorithm depicted in FIG. 5(D).

The 8 bit outputs 59 and 59' of the Edge Transition Detectors 56 and 56' are applied to an edge sample encoder 64 (FIG. 5(A), 5(B), 5 (E)) The sample encoder 64' (FIG. 1) is a combinatorial circuit which directly maps 8 bit edge positions into a 4 bit encoded equivalent as shown in the FIG. 5(F) Truth Table. With reference to FIG. 5(E), it can be seen that the two possible edge position assignment values are subtracted from the current average value in subtractor 70 and 70'. An absolute value is computed for each difference (71/71') and applied to digital comparator 72. A logic 1 is indicative of the A>B condition and selects the mux input that has the toggled sign bit. Between 0 and 5 rising edge samples and falling edge samples will be captured in any given symbol clock cycle.

If the edge sample processing is done at the bit rate, one or two such edge processors are required. This is the preferred configuration. If edge sample processing is done at the symbol rate, five or ten such processors are required to operate in parallel. Rising and falling edges can be processed on alternate phases of the symbol or bit clock so that the amount of circuitry required is roughly one half.

Figure 6A:
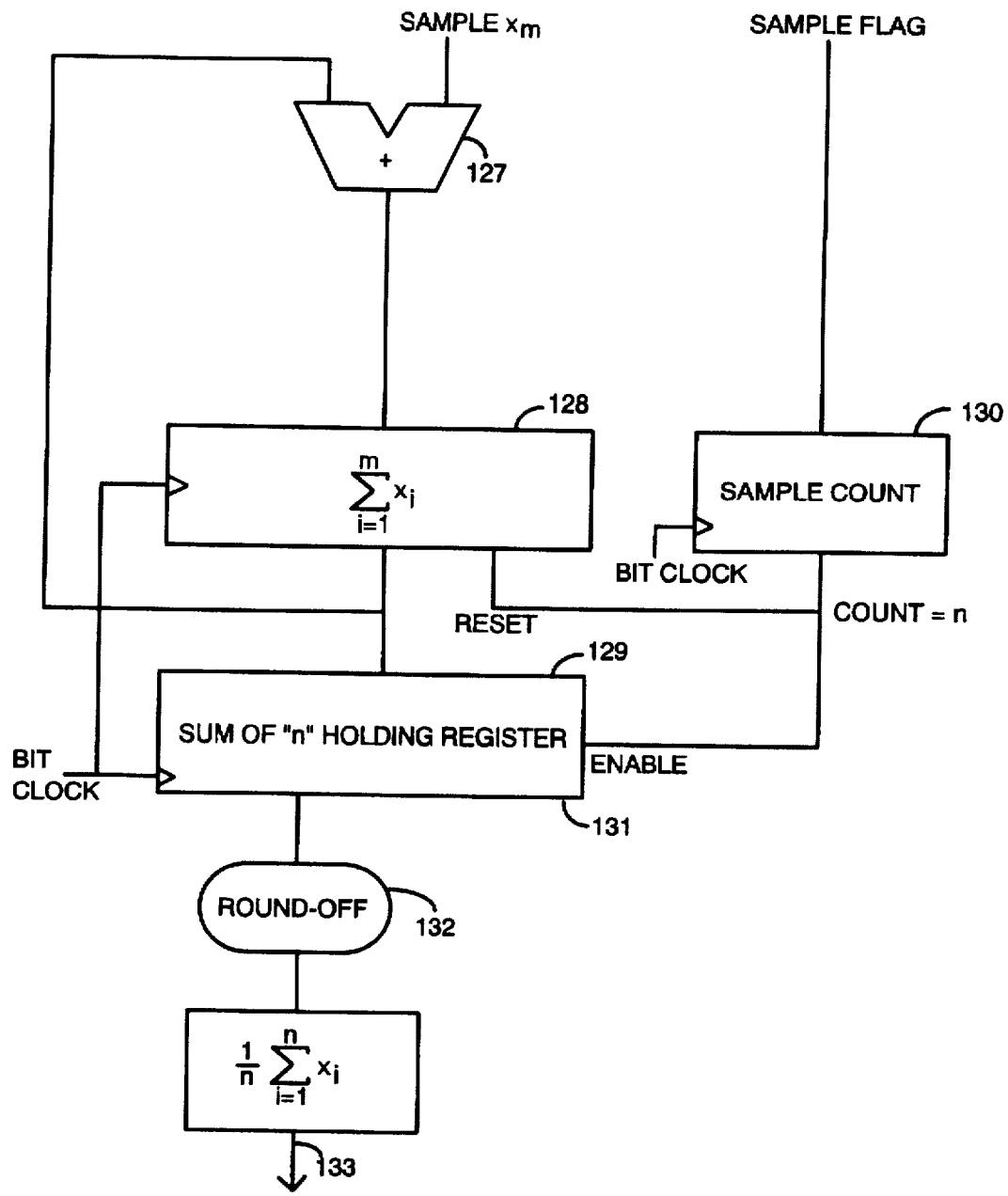
FIG. 6(A) is a primary averager (bit rate) circuit.

Once the detected edges are encoded and the correct code value is selected, the selected value is passed to a primary averager circuit such as shown in block diagram of FIG. 3 and FIG. 6(a). The circuit of FIG. 6(a) will add the value $X_m$ in adder 127 on every bit clock to the sum of prior values accumulated in register 128 until n values have been added together and then a divide by n, rounding is accomplished typically by shifting $log_2 n$ bits and passing the average value 133 to the secondary averager of FIG. 8.

Figure 6B:
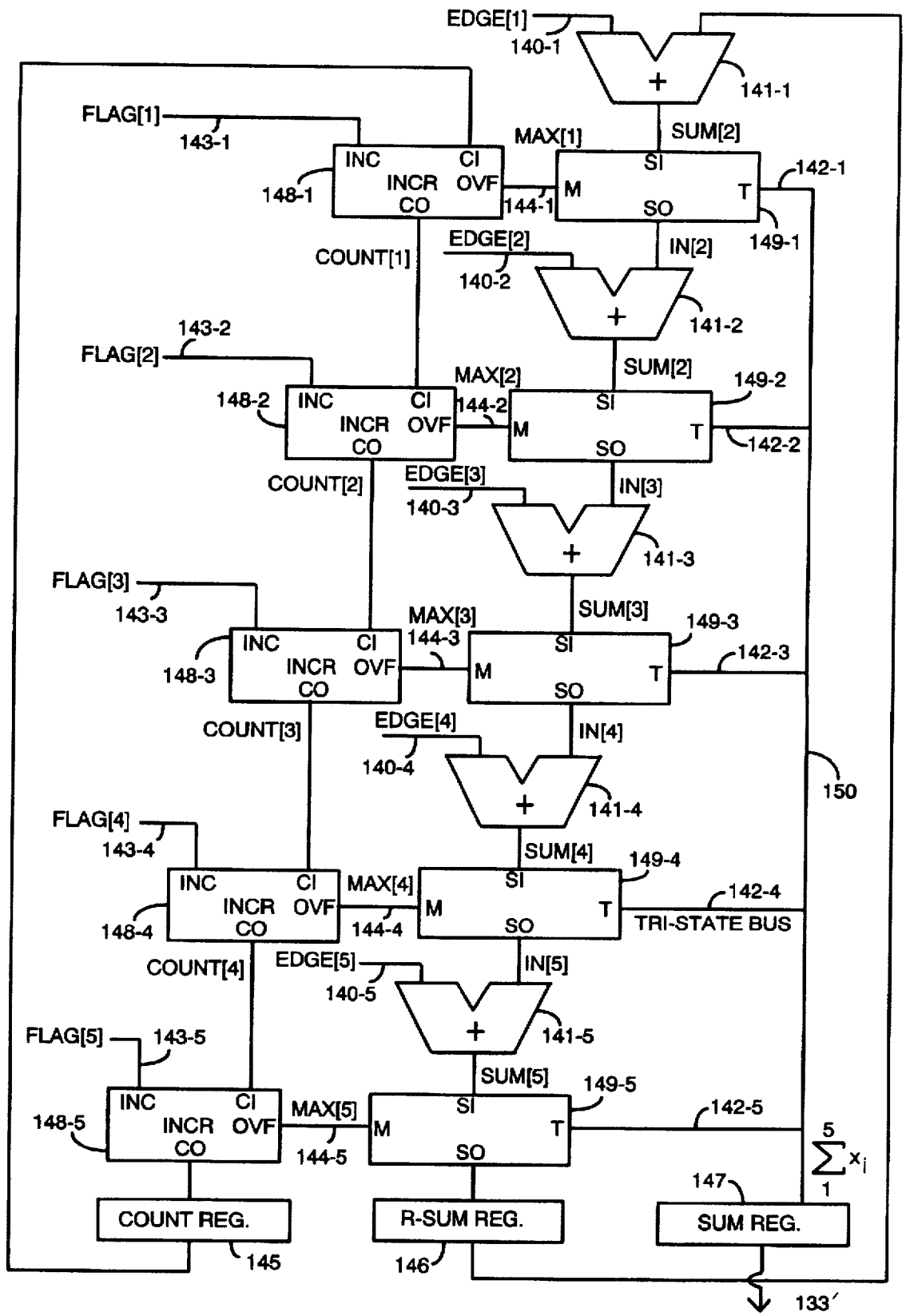
FIG. 6(B) is a primary averager (symbol rate) circuit.
Figure 6C:
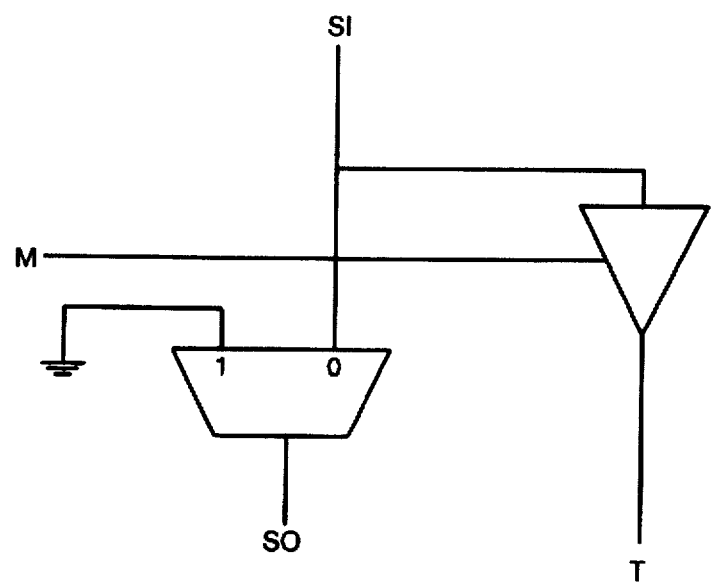
FIG. 6(C) is the logic diagram for switches 149.
Figure 7:
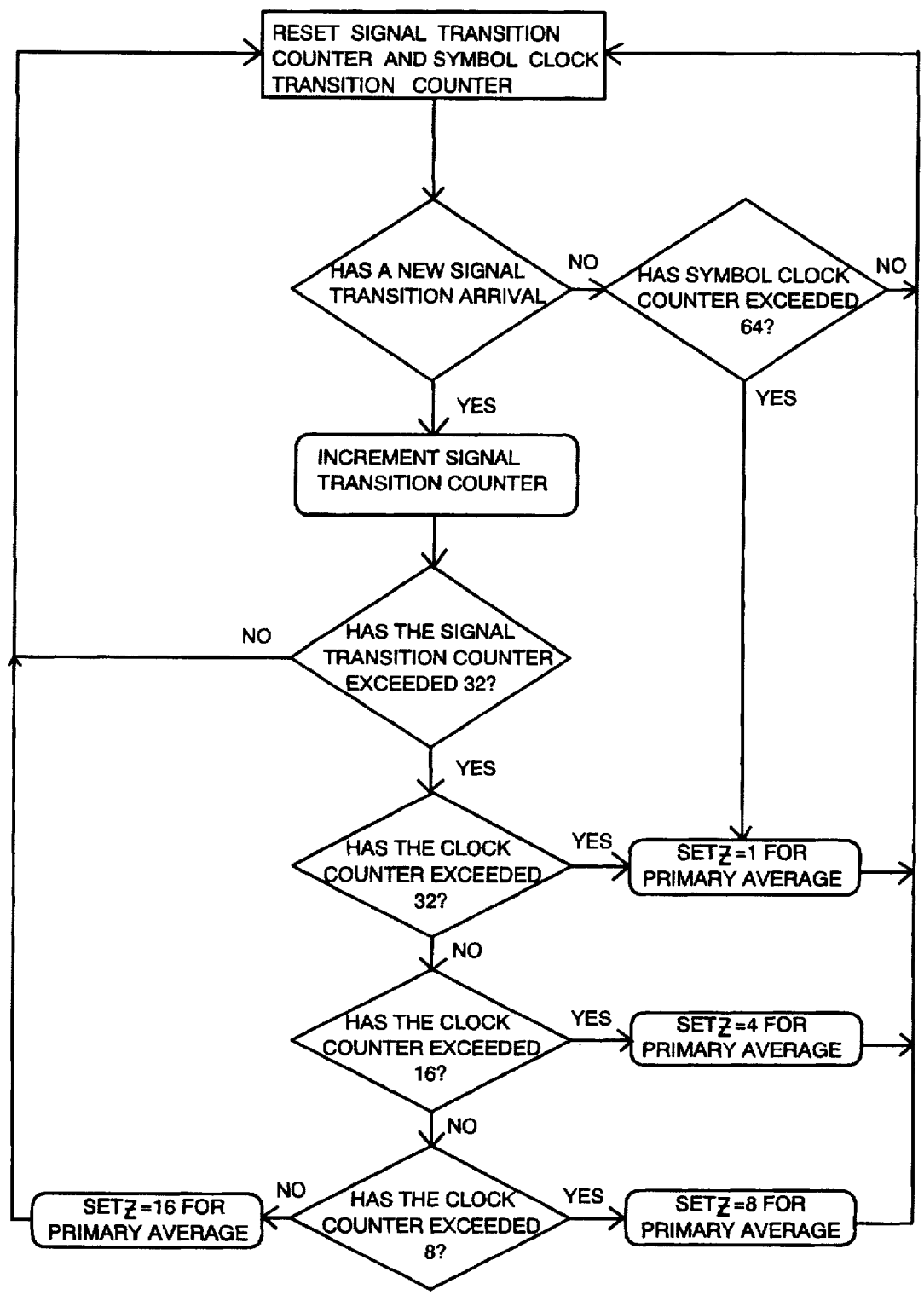
FIG. 7 is the algorithm for transition density adjustment of primary average size.

If this primary averaging is accomplished at the symbol rate instead of the bit rate, then multiple encoded transition samples need to be added to the sum in a given symbol clock cycle. The circuitry to accomplish simultaneous multiple encoding/averaging per symbol cycle is illustrated in FIG. 6(B). Flag signals, i.e., Flag [1], 143-1, Flag [2], 143-2, . . . . Flag [5], indicate whether the corresponding data edge signals have valid data, i.e., Edge [1], 140-1, is valid when register 48(a) has an encoded edge position detected therein. If Flag [n] is true, the value in count INCR register 148-$\eta$, FIG. 6(B), is incremented by one and the incremented value is passed to the next INCR register, 148-($\eta$+1). This procedure is repeated for each INCR register 148-$\eta$. The count value accumulated in each symbol clock cycle is latched into the Count Register 145. When one of the INCR registers reaches a threshold number, Z, an overflow (OVF) signal is generated. Meanwhile, the encoded edge values are added to the current R-sum value in register 146 in consecutive symbol clock cycles. When OVF occurs, the sum input Si at switch 149$\eta$ is output at T of the switch 149-$\eta$ onto the tristate bus 150 and latched into sum register 147. Since the threshold number of encoded data signals is known, the sum signal is $\Sigma^Z X_i$ and the values in registers 145 and 146 are reset. The value of threshold is to be chosen to be a power of 2 so that shifting accomplishes the scaling/division. The threshold Z can also be reduced during periods of low signal transition density so that 100 ppm frequency mismatch will not be filtered. The threshold can also be reduced during initialization so that an initial average can be obtained more rapidly and hasten the initial signal lock-on. An algorithm for monitoring transition density and setting the "threshold" is shown in FIG. 7. The algorithm of FIG. 7 illustrates how the threshold is made responsive to the transition densities.

Figure 8:
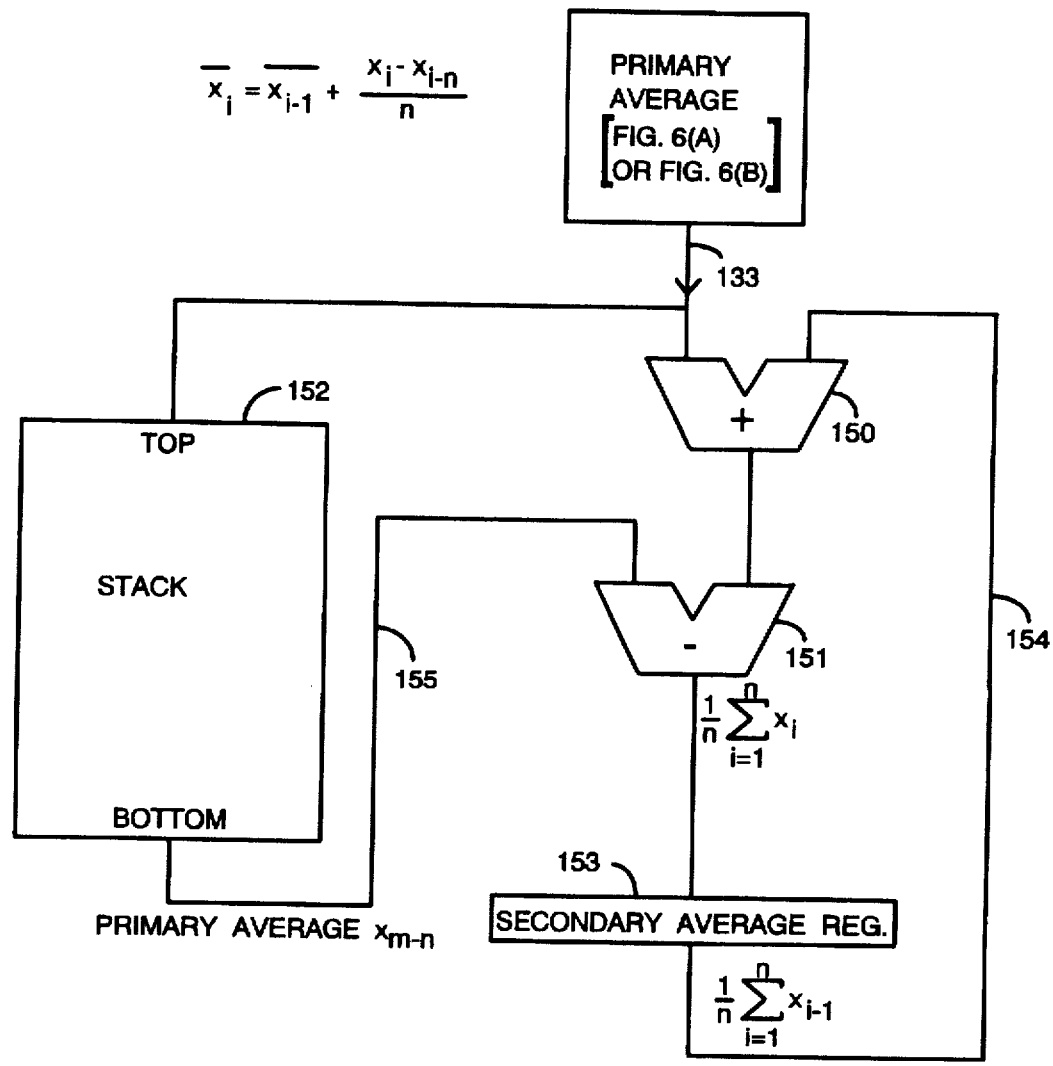
FIG. 8 is secondary averager circuit block diagram.

Once a sum has been obtained and captured in the sum register 147, FIG. 6(B), the least significant $log_2 Z$ bits are rounded off and the result is passed to a secondary/low pass filter such as illustrated in FIG. 8. The primary average after scaling is pushed into a FIFO stack 152, FIG. 8, and provided to an adder 150 where it is added to the current average 154. This secondary averager/low pass filter has a cutoff frequency such that jitter is sufficiently removed while allowing the possible 100 ppm frequency mismatch to pass. A single pole recursive digital low pass filter will also accomplish this result. The value of the bottom of the FIFO is subtracted from the new sum and the result is rounded off yielding the new average. Generally, the FIFO is RAM memory to be accesssed via a stack pointer address.

Figure 9:
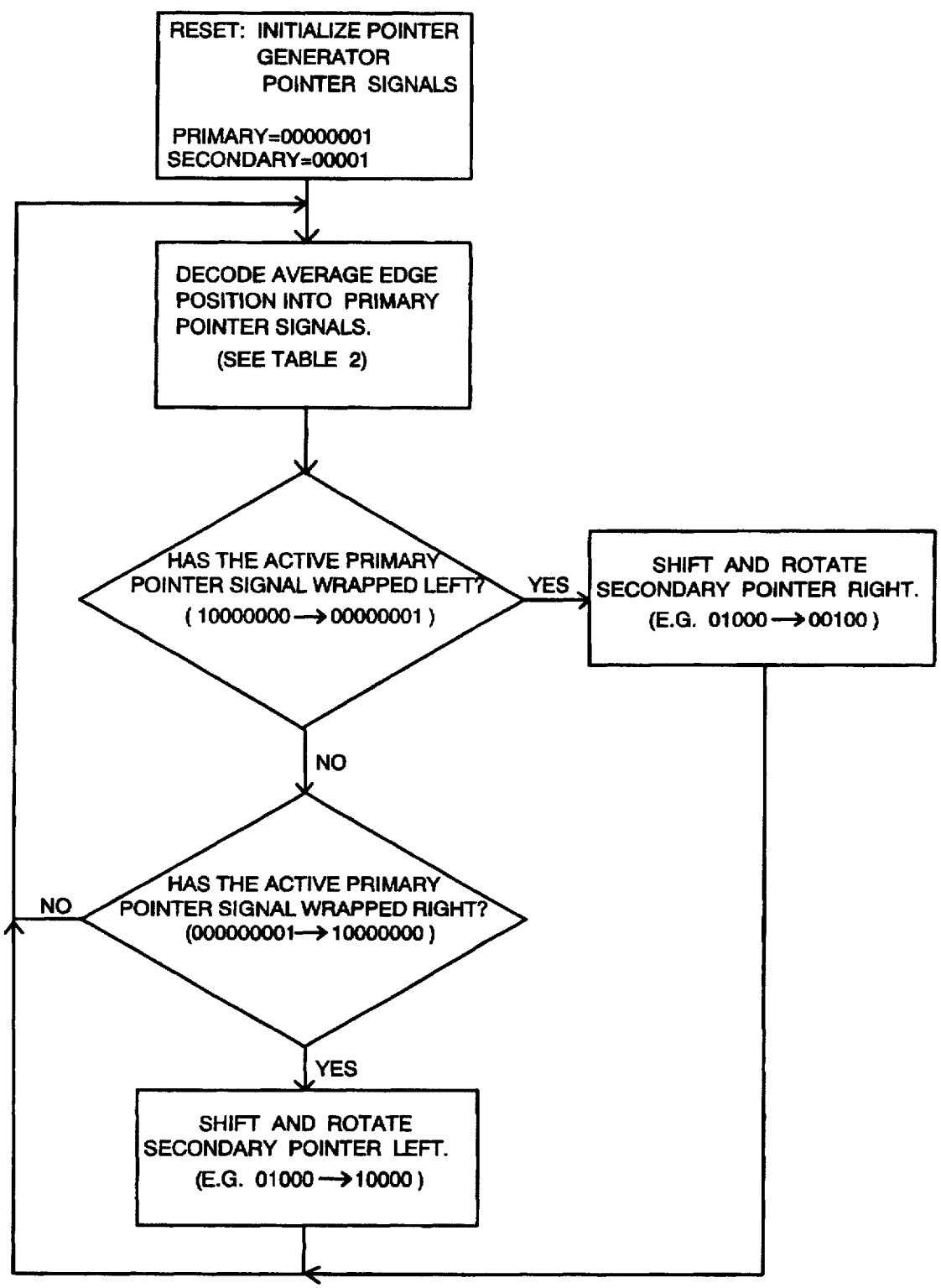
FIG. 9 shows the algorithm to calculate pointer signals.

When the first signal transition is received by the system, the FIFO is empty and there is no current average. An initialization procedure is therefore required which will lead to a steady state mode of operation. During initialization, the primary averager is bypassed, i.e., it passes encoded transitions unaltered to the secondary averager of FIG. 8. The stack pointer for the FIFO of the secondary averager is initialized so that it points to the first byte (i.e., the FIFO depth=1 initially). Also, the shifter for performing the divide by n in the secondary averager is turned off since n=1. The first edge position average value is, therefore, the encoded value of the first signal edge that was received. When the next encoded edge position is passed to the secondary averager, the shifter of the secondary averager is enabled to perform a single shift (divide by 2) and the result is the average of the first two encoded edge position values. Following this step, the stack pointer is advanced so that the FIFO has a depth of 2 bytes. This process continues as shown in FIG. 9. While the computation of an average value is pending, newly arriving edge transitions are ignored. Once the average value has been obtained, the next captured transition is encoded such that it is nearest the new average value (as described earlier).

FIG. 11 shows the Truth Table for the input/output relationship of the Pointer Generator 90 (FIG. 3) for converting the 4 bit average 154 into a group of 8 bit digital signals called the Primary Pointer Signals 94 with a one to one correspondence with the original sampling positions along each delay line 8 ns region. One of the Pointer Generator output signals (eight in the present embodiment) will be enabled and supplied to the Data Selection Switches 79 (FIG. 3). This signal corresponds to the position within the sample that is 180 degrees away from the average position point of the samples. The data sample corresponding to this position is enabled to pass to the D flip-flop 56 where it is latched by a recovered symbol clock.

The recovered symbol clock 93' is mux 92 output (FIG. 3) and is obtained by selecting one of the forty delay line taps responsive to pointer signals 91 from Pointer Generator 90. The recovered symbol clock tap is initialized to immediately shift to the point corresponding to the optimum data extraction point as determined from the average data transmission position within the "data-bit" registers 48.

Figure 10:
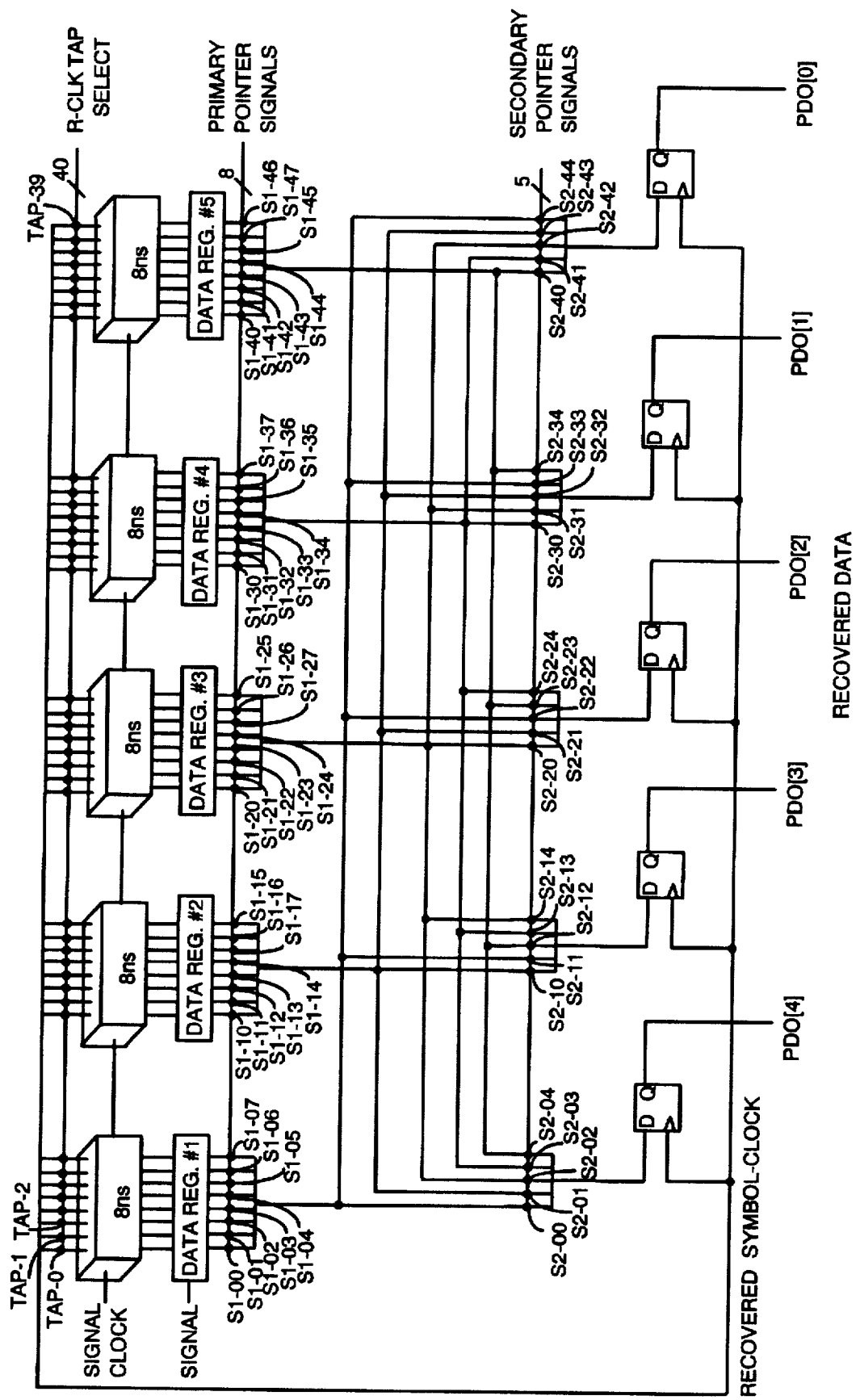
FIG. 10 shows the data extraction technique having primary and secondary pointers for frequency and phase error compensation.

As this optimum data extraction point shifts due to inevitable frequency differences between the local clock reference and the received data, the recovered symbol clock selection point follows it along the delay line. When the data extraction point drifts to the right across a "data-bit" register boundary, the recovered symbol clock selection point also crosses the boundary into the next "data-bit" region. A set of Secondary Pointer Signals 95 (FIG. 3) and switches are used to prevent the "data-bit" (selected by the Primary Pointer Signal) from being selected twice on consecutive recovered virtual bit clock cycles as the result of the recovered symbol clock selection point crossing "data-bit" register boundaries. FIG. 9 shows a flow diagram of logic used in generating the Primary and Secondary Pointer Signals 94 and 95. FIG. 10 shows the switch circuitry that is controlled by these Pointer Signals. A second set of switches S2-00 to S2-40 controlled by the "Secondary Pointer Signals" on lines 101 is used (FIG. 10) to select which 8 ns region's primary switch output will be applied to each output flip-flop. In FIG. 10, the least significant bit of the Primary Pointer Signals is connected to the left most switch of each of the five sets of switches (i.e., S1-00, S1-10, S1-20, S1-30, S1-40). The next significant bit is connected to S1-01, S1-11, S1-21.S1-31, S1-41. The remaining Primary Pointer Signals are similarly connected and follow in order from left to right. The least significant Secondary Pointer Signal is connected to the left most switch of each of the five sets of secondary switches (S2-00, S2-10, S2-20, S2-30, S2-40). The remaining Secondary Pointer Signals follow in order from left to right. To imagine how the bit can be captured twice, consider an example in which the optimum data extraction point for each "data-bit" register 48 shifts from point "S1-07 to S1-10" and the recovered symbol clock signal switches from tap 7 to tap 8. If the outputs of the switches 65 controlled by the Primary Pointer Signals 80 for each "data-bit" region register were applied directly to a corresponding D flip- flop 56, the recovered symbol clock would capture the data at S1-07 while it was being derived from "tap 7" and then immediately capture the data at S1-10 into the D flip-flop corresponding to "data-bit" region #2. Note that these data points are only 1 delay line tap away from each other rather than 8 delay line taps. Effectively, the same "data bit" would be sampled twice if this were allowed to happen. To make this correction, the secondary pointer signals cause "data-bit" region #3 data to be applied to flip-flop #3 and data-bit region #4 data to be applied to flip-flop #3 and so on.

Variations and modifications to the above embodiments may be adapted to provide the features of this invention. Accordingly, the scope of my invention shall be determined by the following claims.

I claim:

1. A method for correcting for jitter in an incoming serial binary pulse train comprising:

(a) generating signals to control sampling of said incoming serial binary pulse train to optimize time of sampling of said incoming binary pulse train, said signal to control said sampling being a locally generated symbol reference clock and generating a local bit reference signal from said locally generated symbol reference clock;

(b) generating a phase control signal for selecting the phase of said locally generated symbol reference clock;

(c) determining a numerical value of positions of a plurality of transition edges of said incoming binary train in comparison to said locally generated bit reference signal said numerical value of said transitions being numerically averaged, and said phase control signal being responsive to said numerical average.

2. The method of claim 1 wherein said step of determining a numerical average of said positions of said plurality of transition edges comprises:

generating an average of the numerical values of a predetermniied number, n, of sequential samples of said positions by adding the most recent sampled numerical value to the sum of the previous n sarnples and deleting the nurmerical value of the oldest of said numerical values included in the sum of previous n samples.

3. The method of claim 2 wherein said step of generating signals to initiate sampling of said incoming binary pulse train includes:

decoding the average of said numerical values into tap selector signals Which are connected to the tap smtch MUX to control the phase of said recovered symbol clock.

4. Apparatus for separating data from an incoming jitter distorted serial binary pulse train of transitions by sampling said data with a signal derived from a local symbol reference clock comprising:

a) means for determiming positions of said transitions in said incoming jitter distorted signal binary pulse train in comparison to an internally generated bit reference derived from said local symbol reference clock;

b) means for determining and assigning a numerical value to the positions of said transitions witlh respect to said internally generated bit reference;

c) means for generating a signal for selecting the phase of said symbol reference clock to be used for sampling said data responsive to averaging of said numerical values of said transitions.

5. A system for generating recovered data from a data signal degraded by jitter, said degraded data signal having transitions between a high and a low logic level, said system employing a symbol signal having a fixed quatity of bits per cycle of said symbol signal, said symbol signal having a symbol period, said symbol period divided by said fixed quantity thereby defining successive bit reference periods begining with a frst bit reference period whose beginni is coincident with a transition of said symbol signal, said system comprising:

a means for generating a first plurality of bit phase signals, said means for generating a first plurality of bit phase signals having a plurality of output texminals and a first input terminal, each of said output terminal providing a different bit phase signal, said first input terminal adapted for connection to a local source of said symbol signal;

said bit phase signals and said symbol signal being cbaracterized by transitions between lhigh and low logic levels;

each said bit phase signal having a frequency Rich is the same as the frequency of said symbol signal;

each said transition of each said bit phase signal separated from transitions of all said other bit phase signals by phase time differences. transitions of each said bit phase signal having a phase time which is displaced by a phase increment fron said transition of the next adjacent one of said other bit phase signals. a first such bit phase signal having a transition coinciding with a transition of said symbol sigral;

a plurality of register means having an input terminal and an output, said degraded data signal being applied to said input terminals of each said plurality register means for sampling said degraded data signal;

said each plurality of register means also including a clocking input, said clocking input of said register meats being connected to a different said output terminal of said means for generating bit phase signals;

a transition detection and encoding means, said transition detection and encoding means being connected to said output terminal of said register xneans for indicating the presence of a transition and for providing a numerical representation of the position of said captured signal transitions relative to boundaries of said bit reference period;

an average means connected to said transition detection and encoding means for collection a plurality of said numerical representations durig successive symbol cycles for each bit reference peziod. and for computing an average pbase difference for each said bit reference period and emitng a signal on output terminals of said averaging means indicating said average phase time difference during each said bit reference period;

said average phase time difference being a difference in phase time between an average transition and a ber. g of said respective bit reference period;

data extractor means, said data etractor means having a first input terminal for receiving said degraded data signal and second input terminals coupled to said averaging means.

6. A system as in claim 5 wherein said means for generating said first plurality of bit phase signals comprises:

a delay line means adapted for propagating said symbol signal;

said delay line means including a first plurality of delay cells having an input and an output and a tap, said delay cells being connected in series begining with a first cell having a first input terminal adapted for connection to said symbol signal source. and a plurality of output terininals of said means for generating bit phase signals being connected to an input terminal of a neighboring cell and being connected to a corresponding input of said register means;

each said cell having a propagation delay equal to said phase increment. said first plurality of delay cells having a total propagation delay equal to a period of said symbol signal, said first plurality of cells separated into equal groups of cells. each group baving said second plurality of cells corresponding to one of said groups of phase increments providing that each group of cells has a propagation delay equal to one bit reference period.

7. A system as in claim 5 which comprises:

a switch system, said switching system having at least one switch connected to each said tap of said delay line;

a coxnpitirng means connected to said averaging means in operable arrangement to compute a fixed average phase time difference being au average value of said average phase time differences and to generate a signal indicating said fixed average phase time difference at an output temial of said computing means;

a tap selector means coupled to said averager. said tap selector means for providing an output to said switch system to select one said output as the recovered symbol clock.

8. A system as in claim 5 wherein said transition detection and encoding means ncludes means for assigning a numerical designation to each output terminal of said means for generatiag a bit phase signal representing said phase tme difference between said itzaition of said respective bit phase signal and said beginning of said bit reference period; and wherein said averaging means includes means for storing said numerical designation of each output terminal where a transition of a bit phase signal coincides with a transition of a data transition. said stored designations being collected from a selected quttitv of successive symbol signal periods, said storing means being coupled to said register means;

means for generating a sum of said stored designations and for dividing said sum by said selected quantity thereby computing an average phase time difference expressed as a numerical designation of an average transition. said sum generating means being connected to said storing means; and means for continually updating said average phase time difference of each bit reference period by computing a difference between said numerical designations of a most recent transition and the oldest transition included in said sum. said difference divided by said selected quantity and algebraically adding said divided difference to said average phase time difference and emitting a signal at said output terminal of said adder indicating said average phase time difference. said updating means being connected to said sum generating means.

9. A system as in claim 8 wherein said transition detection and encoding means includes means for expressing said numerical designations in any one said group of said terminals of said means for generating bit phase signals in cycles of numerical designations. each terminal in one position in a group relative to its location with respect to the beginning of its bit reference period having the same designation as a terna occupying the same position in another group relative to the beginning of its respective bit reference period; and wherein said average means includes, means for shifting a designation of an average transition by one fill cycle of numerical designations back in a direction when said average transition drifts in an opposite direction between neighboring designations belonging to different bit reference periods.

10. A system as in claim 5 wherein said averaging means includes means for assigning a transition to a bit reference period having a smallest difference between said numerical designation of an average transition and said numerical designation of said data transition wherein said numerical designation of said data transition and said average transition are expressed relative to a begixnng of said respective bit reference cycle.

11. A system as in clain 5, wherein each output terminal of said meanls for generating a first plurality of bit reference signal has a numerical designation. said numerical designations representing said phase time difference between a transition of said respective bit phase signal and said beginning of said bit reference peiod; and wherein said average means includes,
first means for storing said numerical designation of each output terminal of the physical location at which a transition of a bit phase signal coincides with a falling transition of said distorted data signal, said stored designations of falling transitions being collected from a selected quantity of successive symbol signal periods, said first storing means being coupled to said register means;

means for generating a sum of said stored designations of falling transitions and dividing said sum by said selected quantity thereby computing an average phase time difference of falling transitions, said first sum generating means connected to said first storing means;

second means for storing said numerical designation of each output terminal at which a transition of a bit phase signal coincides with a rising transition of a distorted data signal, said stored designations of rising transitions being collected fom said selected quantity of successive symbol signal periods, said second storing mneans connected to said register means;

second means for generating a sum of said stored designations of rising transitions and dividing said sum. by said selected quantity thereby computing an average phase time difference of rising transitions, said second sum generated by means being coupled to said second storing means;

means for periodically updating said average phase difference of said rising transitions and said falling transitions of each bit reference period by computing a respective difference between said numerical designations of a most recent rising or failing transition and oldest transition included in said sum divided by said selected quantity and algebraically adding said divided difference to said average phase difference. said updating means being connected to said first and second storing means;

means for adding said stored sum of phase differences of said rising and said sum of phase differences of said falling transitions to obtain a total sum and dividing said total sum by two thereby obtaining a phase difference of an average bransition; and means for providing a signal at said output terminal of said adder indicating average phase time difference.

12. A system as in claim 5 wherein said symbol period is about 40 ns.

13. A system as in claim 5 wherein said increment is about 1 ns.

14. A system as in claim 5 wherein said bit reference period is about 8 ns.

15. A method for generating a recovered data signal from a data signal degraded by duty cycle distortion, said degraded data signal having transitions between a high and a low logic level, said method employing a symbol signal having by a fixed quantity of bits per cycle of said symbol signal , said signal symbol cycle having a symbol period, said symbol period divided by said quantity of bits thereby defining successive bit reference periods beginning with a first bit reference period whose beginning is coincident with a transition of said symbol signal, said method including the steps:

a) generating a first plurality of bit phase signals at a first plurality of output terminals respectively wherein said bit phase signals and said symbol signal being characterized by transitions between high and low logic levels, each said bit phase signal having a frequency which is the samte as a frequency of said symbol signal and each said bit phase signal separated from all said other bit phase signals by phase time differences, each said bit phase signal having a phase time which is a phase increment greater than one of said other bit phase signals beginning with a bit phase signal that has a trasition coinciding with a transition of said symbol signal ;

b) clocking said degraded data signal with said bit phase signals such as to detect a phase time difference between said transitions of said degraded data signal and the boundaries of said bit reference period during wbich said data transitions occur;

c) collecting a plurality of said phase time differences during successive symbol cycles for each hit reference period;

d) computing an average phase time difference for each said bit reference period wherein said average phase tme difference is the difference in phase time between the next previous average phase time and the most current average phase time;

e) generating a sampling control signal to sample said distorted data signal at an optimium signal detection instant responsive to said computed average phase time difference.

\* \* \* \* \*